Sept. 20, 1932.   R. A. WALTER   1,878,044
CONNECTER LINK
Filed Nov. 15, 1930
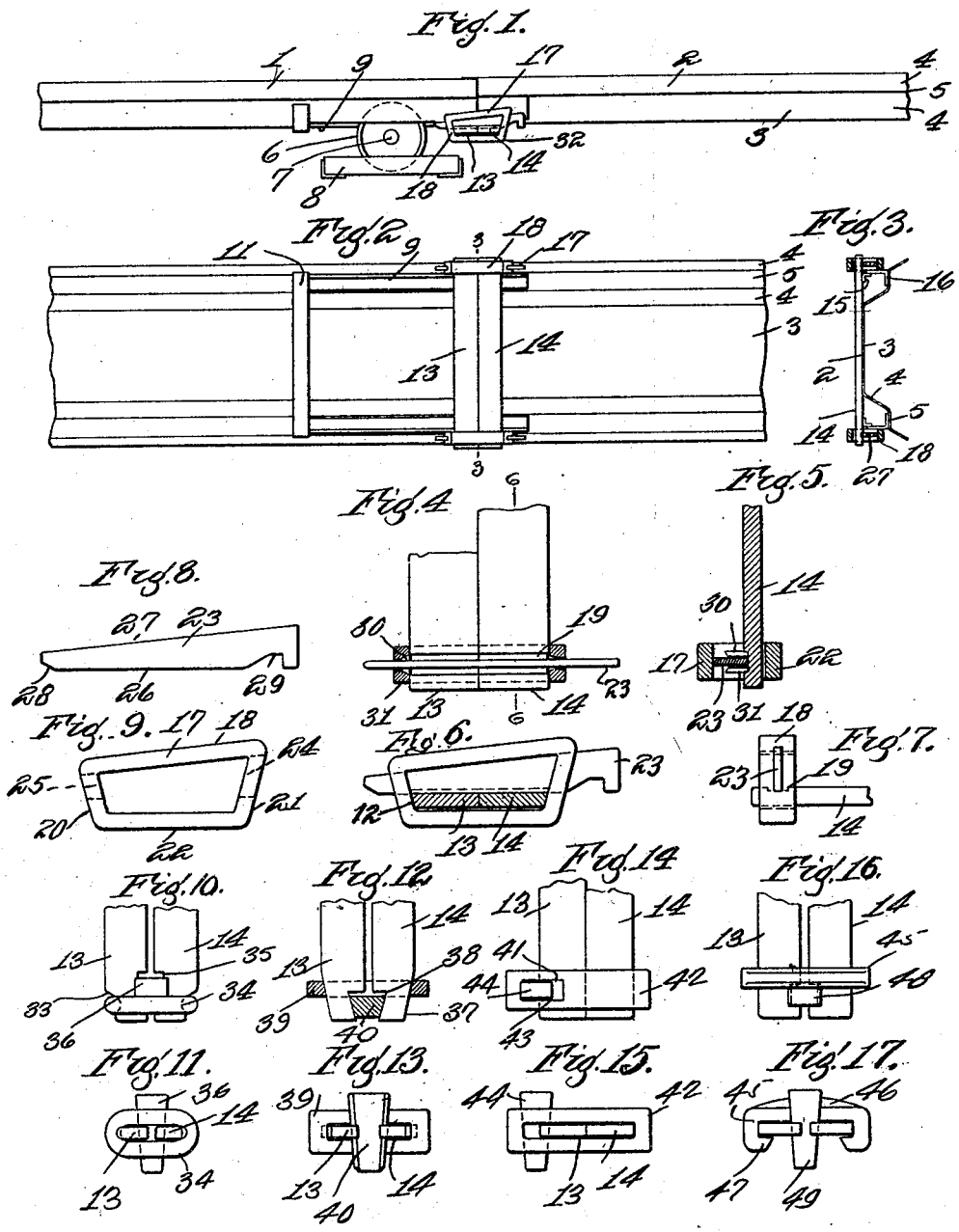
INVENTOR.
R. A. Walter
BY
Semmes & Semmes
ATTORNEYS.

Patented Sept. 20, 1932

1,878,044

UNITED STATES PATENT OFFICE

RAYMOND A. WALTER, OF NEW YORK, N. Y.; BERTHA BAER WALTER EXECUTRIX OF RAYMOND A. WALTER, DECEASED, ASSIGNOR TO GOODMAN MANUFACTURING COMPANY, OF CHICAGO, ILLINOIS, A CORPORATION OF ILLINOIS

CONNECTER LINK

Application filed November 15, 1930. Serial No. 496,017.

This invention relates in general to fastening devices, and more particularly has reference to a connecter for the end of adjacent shaker conveyor troughs.

Previous to this time troughs of this character have usually been fastened together by bolts inserted in eyelets provided in straps fixed on the adjacent ends of the troughs. Besides the usual nuts, various types of retaining members have been employed to fix the bolts in the eyelets.

These retaining members have been primarily designed to facilitate connection and disconnection of adjacent conveyor troughs to eliminate the time and special tools required to unscrew the nut and lock nut ordinarily employed. It will be appreciated, however, that while the members for retaining the bolts in the eyelets have been improved upon, that the disadvantages attending the aligning of eyelets on adjacent troughs and the insertion of connecters therein, have not been overcome.

An object of this invention is to provide a connecter for fastening the ends adjacent conveyor troughs together in which the necessity for aligning eyelets provided on the ends of the troughs for inserting a connecter therethrough, is eliminated.

Another object of this invention is to provide a connecter for fastening the ends adjacent conveyor troughs together, adapted to loosely fit around the opposite edges of transverse members provided on each side of the ends of the troughs, with provision for tightening the fit of the connecter.

Still another object of this invention is to provide an integral connecter for the ends of adjacent conveyor troughs adapted to loosely fit around the opposite edges of transverse members provided on each side of the ends of the troughs, with a supplemental member for tightening the fit of the connecter.

A further object of this invention is to provide a connecter for the ends of adjacent conveyor troughs consisting of an open or closed link adapted to loosely fit around the opposite edges of transverse members provided on each side of the ends of the troughs, and a wedge adapted to tighten the fit of the link around the opposite edges of the transverse members.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing forming a part of this specification:

Figure 1 is a side elevational fragmentary view of the ends of adjacent conveyor troughs, shown fastened together with my novel connecter.

Figure 2 is a bottom view of the apparatus shown in Figure 1 without the rollers or track.

Figure 3 is a sectional view taken on line 3—3 of Figure 2.

Figure 4 is a top view of the transverse straps and wedge showing the link in section.

Figure 5 is a sectional view taken on line 6—6 of Figure 4.

Figure 6 is a side view of the link and wedge showing the straps in section.

Figure 7 is an end view of the link and wedge showing the straps from the side.

Figure 8 is a side view of the wedge.

Figure 9 is a side view of the link.

Figure 10 is a top view of a modified form of connecter.

Figure 11 is a side view of the modified arrangement shown in Figure 10.

Figure 12 is a top view of another modified form of connecter.

Figure 13 is a side view of a modified arrangement shown in Figure 12.

Figure 14 is a top view of still another modified form of connecter.

Figure 15 is a side view of the arrangement shown in Figure 14.

Figure 16 is a top view of a further modified form of connecter.

Figure 17 is a side view of the modified arrangement shown in Figure 16.

Referring more particularly by numerals to the drawing, there is shown in Figure 1 the adjacent ends of a pair of shaker conveyor troughs 1 and 2. The troughs, as shown in Figure 3 are formed with horizontal bottom portions 3 provided with outwardly and upwardly extending walls 4.

The troughs are adapted to be suitably supported, for example, on rollers 6 carried on an axle 7. The rollers may be operated on bottom sectional tracks such as 8 placed under the troughs at suitable intervals on the floor of the working. The troughs may be supported on the rollers on top tracks 9 suitably secured on the underside of the horizontal portions 3 of the troughs. The top tracks are attached to the troughs above the sectional tracks and fixed together at one end by a cross bar 11.

The type of reciprocating conveyor unit illustrated in Figures 1 through 3 is intended to be representative of any character of shaker conveyor trough arrangement susceptible of modification to include my connecter for fastening the ends of adjacent conveyor troughs together. It will be appreciated, therefore, that my invention is in no wise limited to the particular type of conveyor shown.

My invention, as has previously been stated, comprises a connecter for fastening the ends of the adjacent shaker conveyor troughs together. To accomplish this, I attach transversely arranged cross members or straps 13 and 14 on the bottoms of the troughs adjacent the ends thereof. It will be particularly noted that one strap, for example, the strap 13 as shown in Figure 1 is flush with the end of the trough 1, while the strap 14 is mounted slightly to the rear of the end of the trough 2. This provides for overlapping of the ends of the troughs to afford a more secure lateral connection and yet allows for the adjacent edges of the straps to be brought in contact.

The straps are mounted on the under side of the bottom portions 3 of the troughs, as shown in Figure 2. The straps are also connected to the horizontal portions 5 through attached angle members 15 and 16 connected to the tops of the straps and under side of the horizontal portions.

The straps which I employ project outwardly on each side of the troughs adjacent the ends in the same manner as the straps which have been previously employed and provided with eyelets at the ends for the insertion of bolts to connect the troughs. My straps, however, are flat at the end and are adapted to be connected by a novel link 17, as shown in Figure 1 and Figures 4 to 9.

The opposite edges of each of the straps are beveled as at 12, as shown in Figure 6, and provided with transverse aligned grooves 19 adjacent the ends as shown in Figures 4 and 7, for receiving the link, and a wedge cooperating therewith.

The link 17, as shown in Figure 9, is formed with an inclined top 18 and downwardly inclined sides 20 and 21 terminating in a bottom 22 adapted to lie in a parallel plane with the straps when the link is properly positioned.

It will be particularly noted that the opening in the link is wider at the top 18 than at the bottom 22 so that the link may be easily passed over the ends of the cross straps 13 and 14, even though the same are not in actual contact with each other. The opening at the bottom 22 of the link is of just sufficient length to closely fit against the opposite bottom edges of the cross straps when the same are brought in contact, and the sides are inclined at an angle corresponding to the bevel on the opposite edge of the straps. The link is adapted to be placed over the ends of the straps which may then be firmly held together by a wedge 23, adapted to extend through apertures 24 and 25 provided in the sides 20 and 21 of the link.

The wedge, as shown in Figure 8, is formed with a flat bottom edge 26 and an inclined top edge 27. The bottom edge of the tapered end of the wedge is cut away as at 28. The wedge is also provided with a notch 29 on the bottom edge adjacent the other end.

The apertures 24 and 25 provided in the sides of the links 21 and 20 are differently dimensioned and provided with flat bottoms and inclined tops conforming with the configuration of the wedge, to receive the same. The cut away bottom edge on the tapered end of the wedge is adapted to facilitate insertion of the same in the apertures. The bottom of the wedge is flat so as to rest on the tops of the flat ends of the straps 13 and 14 parallel with the bottom 22 of the link. The top of the wedge is inclined, the same degree as the top 18 of the link.

The edges of the side members 19 and 20 adjacent the apertures 24 and 25 are beveled as at 30 and 31, as best shown in Figures 4 and 5 to facilitate entry of the wedge therein. The notch 29 on the outer end of the wedge is provided for insertion of any conventional tool to aid in the removal of the same if, for example, it cannot be loosened by hammering. This may occur when the end of the wedge does not extend to any appreciable extent through the opposite aperture in the link.

The operation of my invention will be readily understood. The ends of adjacent conveyor troughs with the transverse straps 13 and 14 suitably fixed thereunder at and near the respective ends are brought together, and the link fitted over the ends of the respective straps of each side of the troughs as shown in Figure 2. It will be appreciated, as has already been described, that the links are formed so that the straps need not be actually juxtaposed or aligned to allow fitting of the links thereover, but merely substantially so.

After the links have been fitted over the ends of the straps, the wedges are adapted to be inserted in the apertures provided in the sides of the links and pushed or driven in, to align and bring the straps into contact and afford a rigid connection of the trough units. The bottoms of the wedges, inserted in the apertures provided in the sides of the links, are adapted to fit in the transversely aligned groove 19 provided on the tops of the straps adjacent the ends thereof. As the links are thus held against lateral movement in fixed relation to the straps, slipping of the links carrying the wedges from off the straps is prevented.

As has already been pointed out, the links and wedges are so formed that driving of the wedges through the apertures in the sides of the links will align the straps, bringing the sides of the same into contact. The bottoms of the wedges and links and the straps are thus adapted to lie parallel in a horizontal plane when the connecters are properly positioned.

The tops of the wedges and the undersides of the tops of the links are formed with corresponding inclinations, so that the tops of the wedges contact with the bottom portions of the tops of the links throughout the length of the portions of the wedges in the links to afford a uniform pressure on the bottoms of the wedges across the straps. It will be appreciated that the connection and disconnection of adjacent conveyor troughs may be quickly accomplished with my connecter without the aid of special tools in a convenient manner.

The bottoms of the links are formed with rounded corners 32, as shown in Figure 1 to adapt the same for use as suplemental carriages. For example, if the rollers carrying the troughs should become disengaged therefrom allowing the troughs to fall on the working surface, the links by reason of being formed with the rounded corners 32, will act as runners. Thus the troughs will slide back and forth on the bottoms 22 of the links, inasmuch as the links form the lowest part of the trough units. It is apparent that this will relieve the tremendous strains to which the equipment is ordinarily subjected when the support of the rollers is relieved and will allow smooth operation of a unit without jerking until the rollers can again be put in place.

While I have described the preferred form of my invention it will, nevertheless, be apparent that the same is susceptible to wide changes, such for example, as are shown in Figures 10 to 17, inclusive.

In the modified form of connecter shown in Figures 10 and 11, the cross straps 13 and 14 are provided with rounded indentations 33 on the opposite corners, in which the inner sides of a link 34 are adapted to be fitted. The rounded indentations 33 are so proportioned with relation to the inner sides of the link 34 that when the cross straps are brought together the link may be slipped over the ends of the straps, and the inner sides thereof seated in the indented portions.

Corresponding notches are provided in the adjacent edges of the straps inside of the inner edges of the rounded indentations 33 for receiving a wedge 36. After the cross straps have been brought together, and the link placed thereover, and the inner sides of the ends seated in the notches 33, the wedge 36 is adapted to be inserted in the notch 35. The link is prevented from slipping off the straps by the shoulders of the indentations. When the wedge is sufficiently forced in the slot, the indented portions 33 in the straps are brought in firm contact with the inner side walls of the link. It will be appreciated that the link thus connects the troughs in firm tensional contact, while the wedge holds the same in compression. Like in the preferred form of my invention by combining the link and wedge, a firm joint to fasten two adjacent conveyor troughs together is afforded. A similar arrangement is, of course, employed on the opposite ends of the cross straps to complete the joints.

Another modified form of my connecter is shown in Figures 12 and 13, wherein the outer edges of the ends of the cross straps 13 and 14 are tapered as at 37, and the edges provided with corresponding inclined notches 38. A link 39 is adapted to be passed over the ends of the cross straps and slipped along the inclined edges 37. A wedge 40, formed with beveled as well as inclined side portions, is adapted to be inserted in the aperture between the straps formed by the notches 38. The wedge shown in this type of connecter has a multiple effect, tending to bring the cross straps into contact with the inside edges of the link, and also tending to force the link tighter against the outer sides of the straps by reason of the bevel. When the wedge is forced in the aperture provided by the notches, it therefore becomes firmly jammed against the link to connect the troughs and maintain the link in position.

Still another modified form of connecter is shown in Figures 14 and 15 in which a notch 41 is cut in the outer edge of one of the cross straps adjacent the edge, for example, the cross strap 13. A link 42, provided with aligned slots 43 or registering with the apertures 41 in the strap 13, is adapted to be passed over the ends of the cross straps. A wedge 44 is adapted to be inserted through the notch 41 and slots 43 in the link and strap 13, respectively for forcing the respective straps together in the same manner as in the preferred construction of my invention. The notch in the cross strap holds the wedge and prevents sidewise movement of the link in which the same is fitted in respect to the straps.

In Figures 16 and 17 a further modification is shown, in which an open link 45 is substituted for the closed links employed in the other constructions. In using an open link, it is desirable to reinforce the top or bottom according to which is used. The link 45 is accordingly provided with a reinforced top portion 46. Hooks 47 are substituted for a bottom portion, to provide an open link. The straps 13 and 14 are provided with corresponding inclined notches 48 on the inner edges adjacent the ends adapted to receive a wedge 49 like in the constructions shown in Figures 10 through 13. It is intended in the use of this connecter that the straps be brought together and the link passed over the ends thereof beyond the notches in the strap. The wedge may then be driven in the notch to spread the straps against the inner side walls of the link and firmly fasten the ends of adjacent conveyor troughs together.

It will be observed from the foregoing that in both the preferred and alternative constructions of my invention, which I have illustrated and described, that through the convenient agency of the link and wedge I have provided a simple connecter for fastening the ends of adjacent shaker conveyor troughs together. The connecting devices which I employ not only provide for a secure and rigid fastening of the ends of adjacent conveyor troughs, but are so constructed in addition that the same may be adapted to serve as supplemental carriages, or runners, in the event of the roller bearing becoming disengaged.

While I have shown and described a number of modifications of my connecter it will, of course, be understood that my invention is in no wise limited to the particular construction shown, as it is of course susceptible to even more varied changes.

There is accomplished by this invention a connecter for fastening the ends of adjacent shaker conveyor troughs together, in which the necessity of inserting bolts in eyelets provided on the respective ends of the troughs is eliminated. The device is adapted to be fitted over members provided on the ends of the troughs, with provision for tightening the fit.

My connecter is adapted to be fitted without the use of special tools, and is capable of acting as a supplemental carriage for the conveyor troughs if the same should become disengaged from the members upon which the same are normally adapted to operate. My invention is further susceptible of wide modification to adapt the same to different constructions in the most desirable manner.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. A device for connecting the ends of conveyor troughs together, comprising transversely arranged members on the end of each trough projecting beyond the walls thereof on each side, and having the adjacent side edges of each adapted to be juxtaposed when the ends of the conveyor troughs are connected together, links formed to loosely fit around the ends of the adjacent transverse members, and means cooperating between said links and adjacent horizontal surfaces of the transverse members to secure the latter in horizontal alignment, with the adjacent side edges thereof in juxtaposed relation.

2. A device for connecting the ends of conveyor troughs together, comprising transversely arranged members on the end of each trough projecting beyond the walls thereof on each side, and having the adjacent side edges of each adapted to be juxtaposed when the ends of the conveyor troughs are connected together, connecting means adapted to loosely fit around the ends of the adjacent transverse members and horizontally disposed wedges cooperating between the connecting means and adjacent horizontal surfaces of the transverse members to secure the latter in horizontal alignment, with the adjacent side edges thereof in juxtaposed relation.

3. A device for connecting the ends of conveyor troughs together, comprising transversely arranged members on the end of each trough projecting beyond the walls thereof on each side, and having horizontally disposed grooves adjacent the ends thereof, the adjacent side edges of said transversely arranged members being adapted to be juxtaposed when the ends of the conveyor troughs are connected together, links formed to loosely fit around the ends of the adjacent transverse members, and horizontally disposed wedges cooperating between the links and said grooves to bring the transverse members into horizontal alignment, with the adjacent side edges thereof in juxtaposed relation.

In testimony whereof I affix my signature.

RAYMOND A. WALTER.